United States Patent Office.

MARTIN WANNER, OF DENVER, COLORADO, ASSIGNOR OF ELEVEN-TWEN-TIETHS TO WILLIAM B. CRITTENDEN AND JOHN M. MILLMAN, OF BUCYRUS, OHIO.

PROCESS OF REDUCING SULPHIDE ORES AND MANUFACTURING CARBON BISULPHIDE.

SPECIFICATION forming part of Letters Patent No. 497,256, dated May 9, 1893.

Application filed November 30, 1892. Serial No. 453,635. (No specimens.)

*To all whom it may concern:*

Be it known that I, MARTIN WANNER, a citizen of the United States, and a resident of Denver, in the county of Arapahoe and State of Colorado, have invented a certain new and useful Process of Reducing Sulphide Ores and the Manufacture of Carbon Bisulphide, of which the following is a specification.

My invention relates to a new method of direct reduction of sulphide ores affording as resulting products metal and carbon bi-sulphide ($CS_2$). The ores especially adapted for this process are the sulphide of zinc, antimony, mercury, silver, in fact the sulphides of all metals irrespective of their special class; although some of these metals require so high a temperature to carry out my process, that specially prepared retorts will have to be employed, adapted to withstand the heat required to practice the same.

I say that my method relates to the direct reduction of sulphide ores; by that I intend to draw a distinction between my method and methods which have heretofore been practiced, which have been essentially different from mine, because they have been only preparatory treatments necessitating subsequent operations before any products either of metal or by-products could be obtained. For instance sulphur ores have been ground or reduced to fine condition and mixed with carbonaceous materials, then put into a retort and subjected to heat, with the intention of desulphurizing the ores, but no metallic products nor any commercial by-products were obtained by such processes, and in order to obtain the metal or other products, it is necessary to further and additionally treat the mass by subsequent processes, which further or additional treatment was separate and distinct from the primary treatment just referred to, and carried on in a separate and distinct apparatus.

By my method, I obtain by the practice of a single continuous operation, carried on in a single apparatus: First, the metal itself, and second as a by-product, carbon bi-sulphide, and my process is simple, inexpensive, rapid and adapted to the treatment of all classes of sulphide ores as above stated.

The mode of procedure consists in smelting the clean sulphides with a quantity of pure carbon in suitable retorts. The amount of the carbon should be properly proportioned to the sulphur in the ore. The liberated gaseous carbon bi-sulphide is carried over into a suitably constructed condenser or receiver and is there condensed, and the metal, provided it is not volatile at the temperature employed, percolates in molten condition through the charge in the retort or crucible and collects in its bottom, from which it is tapped off. In the case of mercury or other metals which are volatile at the temperature employed, the vapors of the metal are carried over into the condenser or receiver together with the carbon bi-sulphide vapors and are there separated by gravity and results which proper temperatures are observed in a complete reduction of the change.

To illustrate the details of the process, I will now describe it, using as an ore to be reduced, a sulphide of zinc. The ore is carefully dressed, to clean it from rock or other objectionable matter. It is then mixed with the necessary quantity of carbon, such as charcoal, lamp-black or the like. In some instances a hydro-carbon or a mixture of different forms of carbon, or of carbon and hydro-carbon, may be beneficially employed. The mass thus obtained is reduced by suitable machinery to a finely divided condition. To prevent the fine particles of ore and carbon from being carried over into the condensers by the current of gaseous carbon bi-sulphide disengaged during the operation of reduction, it may be moistened with a sufficient quantity of liquid, preferably a hydro-carbon, to agglutinate the particles. The mass is then preferably baked at a temperature below the ignition point of the hydro-carbon, if it be employed and the resulting coked matter again broken up into pieces of suitable size to enter the retort for final reduction.

Instead of using carbon in its solid state, the reaction may also be brought about by placing the broken ore in a retort and forcing a current of any gaseous hydro-carbon through the heated ore. In this event, hydrogen sulphide will be an additional by-product.

The reduction is carried on in a retort furnace, the construction of which may be such as preferred. The retort however should be air-tight or practically so, and have a connection with a suitable condenser, which should preferably be cooled artificially as by running water or in any other suitable way. The charge is introduced through the removed man-hole or cover of the retort, which is then sealed. The reduction can be observed through a peep-hole suitably placed.

It will be observed that my process may be made continuous by employing a properly constructed furnace. The temperature required for the reduction varies with the ores treated; a bright red will be found to give satisfactory results with zinc sulphides; in order, however, to effect a complete reduction and separation of ultimate molecules of the sulphur from the metal it is desirable to augment the temperatures during the later stages of the operation. The liberated carbon bi-sulphide vapors pass off through the conduit or connection with the receiver, while the metallic zinc in molten condition is tapped off at the tap-hole of the retort.

My improved process as above set forth is different from and superior to all others known to me, in that I take the ore in its natural state, and after proper dressing, secure by the treatment described, and by one and the same operation the metal from the retort and the carbon bi-sulphide from the condenser. And if the proportion of the carbon or hydro-carbon relative to the sulphur has been exact and proper temperature observed there will be no residue. If there are any however they will not interfere with the continued operation of the process, the retort being from time to time cleaned of them.

I claim—

1. The described method of reducing sulphide ores consisting in removing the gangue from the ore, reducing the remaining sulphide or sulphides to fine particles, mixing them with carbon or hydro-carbon, heating the resulting mass in a closed retort, collecting and condensing the carbon bi-sulphide vapor and removing the reduced metal in a fluid condition, substantially as set forth.

2. The described method of reducing sulphide ores and simultaneously manufacturing carbon bi-sulphide consisting in removing the gangue from the ore, finely dividing the remaining sulphide or sulphides, mixing them with carbon or hydro-carbon in fine condition, subjecting the mass to destructive distillation, collecting and condensing the carbon bi-sulphide vapor and removing the reduced metal in a fluid condition, substantially as set forth.

3. The described method of treating sulphide ores containing volatile metals which consists in removing the gangue from the ore, reducing the remaining sulphides to fine particles, mixing them with carbon or hydro-carbon, subjecting the mixture to destructive distillation, collecting and condensing the resulting carbon bi-sulphide and vaporized metal and drawing off the remaining metal, substantially as set forth.

4. The described process of reducing sulphide ores consisting in removing the gangue from the ore reducing the remaining sulphide or sulphides to fine condition, mixing it with finely divided carbon then moistening the mass with liquid hydro-carbon to prevent carrying over into the condenser and heating the product until the reduction is effected, substantially as set forth.

5. The described process of reducing sulphide ores consisting in removing the gangue from the ore, reducing the remaining sulphide or sulphides to fine condition mixing it with finely divided carbon then moistening the mass with liquid hydro-carbon then baking or coking it and heating the product until the reduction is effected, substantially as set forth.

Signed at New York city, in the county of New York and State of New York, this 15th day of November, A. D. 1892.

MARTIN WANNER.

Witnesses:
PHILLIPS ABBOTT,
E. SIMPSON.